(12) United States Patent
Wei et al.

(10) Patent No.: US 12,363,758 B2
(45) Date of Patent: Jul. 15, 2025

(54) METHOD RELATED TO RANDOM ACCESS AND USER EQUIPMENT

(71) Applicant: SHARP KABUSHIKI KAISHA, Sakai (JP)

(72) Inventors: Chia-Hung Wei, Taipei (TW); Hai-Han Wang, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 464 days.

(21) Appl. No.: 17/968,774

(22) Filed: Oct. 18, 2022

(65) Prior Publication Data

US 2023/0120155 A1  Apr. 20, 2023

Related U.S. Application Data

(60) Provisional application No. 63/262,743, filed on Oct. 19, 2021.

(51) Int. Cl.
*H04W 74/0833* (2024.01)
(52) U.S. Cl.
CPC ............... *H04W 74/0833* (2013.01)
(58) Field of Classification Search
CPC .................. H04W 12/28; H04W 12/50
USPC ................... 370/329, 401, 402, 403
See application file for complete search history.

(56) References Cited

U.S. PATENT DOCUMENTS 12,167,317 B2 * 12/2024 Tseng ............ H04W 72/21

OTHER PUBLICATIONS

3GPP, "3rd Generation Partnership Project; Technical Specification Group Radio Access Network; NR; Radio Resource Control (RRC) protocol specification (Release 16)", 3GPP TS 38.331 V16.6.0 (Sep. 2021), Sep. 2021, pp. 1-961.
3GPP, "3rd Generation Partnership Project; Technical Specification Group Services and System Aspects; System architecture for the 5G System (5GS); Stage 2 (Release 17)", 3GPP TS 23.501 V17.2.0, Sep. 2021, pp. 1-542.

* cited by examiner

*Primary Examiner* — Dang T Ton
(74) *Attorney, Agent, or Firm* — ScienBiziP, P.C.

(57) ABSTRACT

A method related to random access (RA) and a user equipment (UE) are provided. The method includes: initiating a RA procedure; identifying the RA procedure is associated with a service; identifying the service is supported by a base station (BS); determining whether to perform a comparison with a reference signal received power (RSRP) threshold for determining a RA type of the RA procedure according to a resource configuration for the RA type; determining the RA type according to the resource configuration in response to the resource configuration being that a resource selected for the RA procedure is configured with merely one RA type associated with the service; and performing the comparison with the RSRP threshold for determining the RA type in response to the resource configuration being that the resource selected for the RA procedure is not configured with merely one RA type associated with the service.

20 Claims, 5 Drawing Sheets

METHOD RELATED TO RANDOM ACCESS AND USER EQUIPMENT

CROSS-REFERENCE TO RELATED APPLICATION(S)

The present application claims the benefit of and priority to U.S. Provisional Patent Application Ser. No. 63/262,743, filed on Oct. 19, 2021, entitled "CONFIGURATION AND IDENTIFICATION OF REDUCED CAPABILITY UE IN NEW RADIO", the content of which is hereby incorporated fully by reference herein into the present disclosure.

FIELD

The present disclosure generally relates to wireless communications, and more particularly, to a method related to random access (RA) and a user equipment (UE).

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

NR had been developed in 3GPP Release 15 as one of representative 5G mobile network worldwide. By utilizing those novel mechanisms designed for the NR, a gNB (i.e., base station) can serve (support) variety types of service which had quite diverse requirements (i.e., such as eMBB, URLLC and mMTC) simultaneously. Since people start thinking of, based on the NR, enabling connected industries for improving flexibility, enhancing productivity and efficiency, reducing maintenance cost, and improving operational safety, NR may need to introduce additional type of UE to achieve these goals. That is, besides the eMBB, URLLC and mMTC devices, a new type of device, Reduced Capability (RedCap), is considered. The RedCap device having lower cost and lower complexity of hardware as compared to high-end eMBB and URLLC devices. For example, the bandwidth and the number of receiving branches of the RedCap UE may be reduced. In order to serve the RedCap UE (i.e., device), it is expected that the NR needs to be further enhanced.

SUMMARY

The present disclosure is directed to a method related to random access (RA) and a user equipment (UE).

According to one or more exemplary embodiments of the disclosure, a method related to RA used for UE is provided. The method includes, but is not limited to, initiating a RA procedure; identifying the RA procedure is associated with a service in response to initiating the RA procedure; identifying the service is supported by a base station (BS); determining whether to perform a comparison with a reference signal received power (RSRP) threshold for determining a RA type of the RA procedure according to a resource configuration for the RA type in response to the service being supported by the BS; determining the RA type according to the resource configuration in response to the resource configuration being that a resource selected for the RA procedure is configured with merely one RA type associated with the service; and performing the comparison with the RSRP threshold for determining the RA type in response to the resource configuration being that the resource selected for the RA procedure is not configured with merely one RA type associated with the service.

According to one or more exemplary embodiments of the disclosure, a UE is provided. The UE includes but is not limited to, one or more memories and one or more processors. The memory includes computer-executable instructions embodied thereon. The processor is coupled to the memory. The processor is configured to execute the computer-executable instructions to perform the following steps: initiating a RA procedure; identifying the RA procedure is associated with a service in response to initiating the RA procedure; identifying the service is supported by a BS; determining whether to perform a comparison with a RSRP threshold for determining a RA type of the RA procedure according to a resource configuration for the RA type in response to the service being supported by the BS; determining the RA type according to the resource configuration in response to the resource configuration being that a resource selected for the RA procedure is configured with merely one RA type associated with the service; and performing the comparison with the RSRP threshold for determining the RA type in response to the resource configuration being that the resource selected for the RA procedure is not configured with merely one RA type associated with the service.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

The acronyms in the present disclosure are defined as follows and unless otherwise specified, the acronyms have the following meanings:

| Acronym | Full name |
| --- | --- |
| 3GPP | 3$^{rd}$ Generation Partnership Project |
| NR | New Radio |
| SSB | Synchronization Signal Block |
| CSI-RS | Channel State Information Reference Signal |

-continued

| Acronym | Full name |
|---|---|
| PCell | Primary Cell |
| SCell | Secondary Cell |
| RedCap | Reduced Capability |
| RRC | Radio Resource Control |
| PDCP | Packet Data Convergence Protocol |
| MAC | Medium Access Control |
| PHY | Physical (layer) |
| MAC CE | MAC Control Element |
| DCI | Downlink Control Information |
| DL | Downlink |
| UL | Uplink |
| DL-SCH | Downlink Shared Channel |
| DRB | (user) Data Radio Bearer |
| DRX | Discontinuous Reception |
| DTCH | Dedicated Traffic Channel |
| EN-DC | E-UTRA NR Dual Connect |
| FDD | Frequency Division Duplex |
| TDD | Time Division Duplex |
| PDCCH | Physical Downlink Control Channel |
| PUSCH | Physical Uplink Shared Channel |
| BWP | Bandwidth Part |
| RA | Random Access |
| AS | Access Stratum |
| PDU | Protocol Data Unit |
| TB | Transport Block |
| LCH | Logical Channel |
| TS | Technical Specification |
| NDI | New Data Indicator |
| RNTI | Radio Network Temporary Identity |
| C-RNTI | Cell Radio Network Temporary Identifier |
| MCS-C-RNTI | Modulation Coding Scheme Cell Radio Network Temporary Identifier |
| CS-RNTI | Configured Scheduling Radio Network Temporary Identifier |
| DRX | Discontinuous Reception |
| TAG | Timing Advance Group |
| SLIV | Start and Length Indicator Value |
| NUL | Normal UL |
| SUL | Supplementary UL |
| RSRP | Reference Signal Received Power |
| LCID | Logical Channel Identity |
| CORESET | Control Resource Set |
| HARQ | Hybrid Automatic Repeat Request |
| NACK | Negative Acknowledgement |
| ACK | Acknowledgement |
| CSS | Common Search Space |
| USS | UE Specific Search Space |
| ETSI | European Telecommunications Standards Institute |
| ITU | International Telecommunication Union |
| CBRA | Contention-Based Random Access |
| CFRA | Contention-Free Random Access |
| RAR | Random Access Response |
| SDU | Service Data Unit |
| CCCH | Common Control Channel |
| RedCap | Reduced Capability |
| SDT | Small Data Transmission |
| CovE | Coverage Enhancement |
| MIMO | Multiple-Input and Multiple-Output |
| SIB | System Information Block |
| MIB | Master Information Block |
| S-NSSAI | Single Network Slice Selection Assistance Information |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more Ues within its radio coverage (e.g., each cell schedules the Downlink (DL) and optionally Uplink (UL) resources to at least one UE within its radio coverage for DL and optionally UL packet transmission). The BS may communicate with one or more Ues in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (Pcell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (Scells). An SCG may refer to a group of serving cells associated with the Secondary Node (SN), including the SpCell and optionally one or more Scells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the Pcell and zero or more secondary cells. Conversely, the SCG is a set of one or more serving cells including the PSCell and zero or more secondary cells.

As also described above, the Primary Cell (Pcell) may be an MCG cell that operates on the primary frequency, in which the UE either performs the initial connection establishment procedure or initiates the connection reestablishment procedure. In the MR-DC mode, the Pcell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a Pcell of the MCG, or a PSCell of the SCG, depending on whether the MAC entity is associated with the MCG or the SCG. Otherwise, the term Special Cell may refer to the Pcell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (Scell) which may be the primary cell. Conversely, for a UE in the RRC_CONNECTED state that is configured with the CA/DC a set of serving cells including the special cell(s) and all of the secondary cells may communicate with the UE.

Some related technologies are introduced first.

Cell: Radio network object that can be uniquely identified by a User Equipment from a (cell) identification that is broadcasted over a geographical area from one UTRAN Access Point. A Cell is either FDD or TDD mode.

Serving Cell: For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells.

CA: In Carrier Aggregation (CA), two or more Component Carriers (CCs) are aggregated. A UE may simultaneously receive or transmit on one or multiple CCs depending on its capabilities. CA is supported for both contiguous and non-contiguous CCs. When CA is deployed frame timing and SFN are aligned across cells that can be aggregated. The maximum number of configured CCs for a UE is 16 for DL and 16 for UL. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (Pcell). Depending on UE capabilities, Secondary Cells (Scells) can be configured to form together with the Pcell a set of serving cells. The configured set of serving cells for a UE therefore always consists of one Pcell and one or more Scells.

BWP: A subset of the total cell bandwidth of a cell is referred to as a Bandwidth Part (BWP) and BA is achieved by configuring the UE with BWP(s) and telling the UE which of the configured BWPs is currently the active one. To enable Bandwidth Adaptation (BA) on the Pcell, the gNB configures the UE with UL and DL BWP(s). To enable BA on Scells in case of CA, the gNB configures the UE with DL BWP(s) at least (i.e., there may be none in the UL). For the Pcell, the initial BWP is the BWP used for initial access. For the Scell(s), the initial BWP is the BWP configured for the UE to first operate at Scell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an Scell, the firstActiveUplinkBWP IE field contains the ID of the uplink bandwidth part to be used upon MAC-activation of an Scell.

Timer: MAC entity can setup one or more timers for individual purposes, for example, triggering some uplink signaling retransmission or limiting some uplink signaling retransmission period. A timer is running once it is started, until it is stopped or until it expires; otherwise it is not running. A timer can be started if it is not running or restarted if it is running. A Timer is always started or restarted from its initial value. The initial value can be but not limited to be configured by the gNB via downlink RRC signaling or be pre-defined/pre-determined value addressed in some specification.

PDCCH: In the downlink, the gNB can dynamically allocate resources to Ues at least via the C-RNTI/MCS-C-RNTI/CS-RNTI on PDCCH(s). A UE always monitors the PDCCH(s) in order to find possible assignments when its downlink reception is enabled (activity governed by DRX when configured). When CA is configured, the same C-RNTI applies to all serving cells.

PDSCH/PUSCH: The PDCCH can be used to schedule DL transmissions on PDSCH and UL transmissions on PUSCH.

Transport Block: The data from the upper layer (or MAC) given to the physical layer is basically referred as transport block.

HARQ: A functionality ensures delivery between peer entities at Layer 1 (i.e., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each of HARQ entity supports a parallel (number) of DL and UL HARQ processes.

Hybrid automatic repeat request acknowledgement (HARQ-ACK): A HARQ-ACK information bit value of 0 represents a negative acknowledgement (NACK) while a HARQ-ACK information bit value of 1 represents a positive acknowledgement (ACK).

Physical Downlink Control Channel (PDCCH): In New Radio (NR) wireless communication system, a downlink data reception at UE side is achieved by monitoring physical downlink control channel (PDCCH) and find possible assignment. The assignment represented as a (UE specific) downlink control information (DCI). And, the DCI is found on PDCCH via blind decoding. From the implementation of blind decoding aspect, the UE may be configured with a set of PDCCH candidates within one or more CORESET. The PDCCH candidate set for the UE to monitor is defined in terms of PDCCH search space sets (or search space sets). A search space set can be categorized into two types (i.e., either a Common Search space (CSS) set or a UE Specific Search Space (USS) set). That is, a UE monitors PDCCH candidates according to one or more configured search spaces set to decode possible PDCCH transmitted by the gNB. In other words, a PDCCH may be found in the PDCCH candidates within the monitored search space sets. From more further details of implementation perspective, the UE monitors a set of PDCCH candidates in one or more CORESETs and/or Search Spaces on a DL BWP (e.g., the active DL BWP on each activated serving cell or the initial BWP on a camped cell) configured with PDCCH monitoring according to corresponding search space sets where the monitoring implies decoding each PDCCH candidate according to the monitored DCI formats. That is, the DCI with CRC bits scrambled by UE specific RNTI (e.g., C-RNTI) is carried by the PDCCH, and the DCI is founded by UE descrambling the CRC bits with the RNTI.

CORESET and Search Space: As mentioned above, UE monitors PDCCH candidates within one or more CORESET. Wherein a CORESET may be represented as a specific radio resource indicated by the gNB via one or more configuration (i.e., ControlResourceSet information element (IE)). The one or more configurations may be transmitted by the gNB to the UE via broadcast system information block (SIB) or dedicated (unicast) signaling. It is assumed that a CORESET having a particular width in frequency domain as well as a particular width in time domain which were indicated by the ControlResourceSet IE. In time domain, the CORESET may be periodically appeared (i.e., allocated by gNB). The exact positions of the CORESETs in time domain were preconfigured by the gNB to the UE through a SearchSpace IE. Each ControlResourceSet is indexed with a CORESET ID which is carried by the ControlResourceSet IE itself. Similarly, each SearchSpace is indexed with a SearchSpace ID which is carried by the SearchSpace IE itself. Meanwhile, for each of configured SearchSpaces IE, it will be associated with one ControlResourceSet IE which is indicated through the SearchSpaces IE. Hence, by providing the associated ControlResourceSet IE and SearchSpaces IE to UE, gNB indicates the CORESET to UE for PDCCH monitoring. As mentioned earlier, each search space may be further be categorized as CSS or USS which is indicated by the gNB to the UE via corresponding SearchSpace. UE may be indicated with multiple search spaces, each may be applied by the gNB for different purposes, for example, a SearchSpace for a purpose of random access and another SearchSpace for a purpose of normal data transmission/reception assignment.

The terms, definitions and abbreviations as given in this document are either imported from existing documentation (ETSI, ITU or elsewhere) or newly created by 3GPP experts whenever the need for precise vocabulary was identified.

Figure 1:
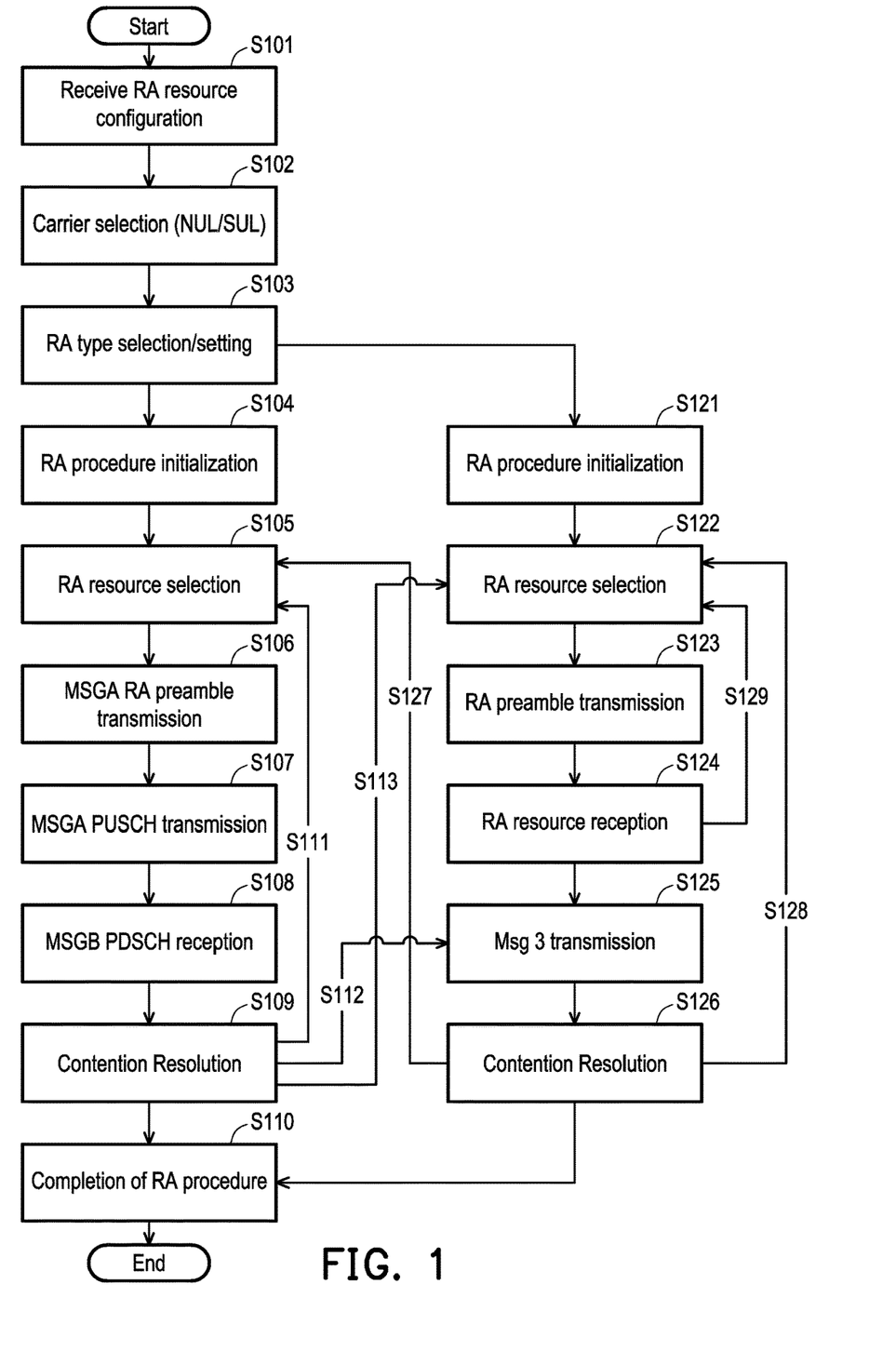
FIG. 1 is a flow chart of an overall procedure among 2-step and 4-step RA according to an example implementation of the present disclosure.

FIG. 1 is a flow chart of an overall procedure among 2-step and 4-step RA according to an example implementation of the present disclosure.

Referring to FIG. 1, an example of random access performed by a UE is illustrated. It is noted that in this example, both 2-step and 4-step RA random access resources are configured by the gNB.

Step S101: The UE receives RA related configuration(s) from gNB via RACH-ConfigCommon, RACH-ConfigDedicated, RACH-ConfigGeneric, RA-Prioritization and/or any other information element (IE) which may be contained in broadcast RRC message and/or unicast RRC message. The RA related configuration may include (but not limited to only include):

rsrp-ThresholdSSB-SUL: an RSRP threshold for the selection between the NUL carrier and the SUL carrier;
msgA-RSRP-Threshold: an RSRP threshold for the selection for 2-step RA type;
msgA-TransMax: a maximum number of MSGA transmissions when both 4-step and 2-step RA type Random Access Resources are configured;
msgB-ResponseWindow: time window to monitor RA response(s) for 2-step RA type.

Step S102: The UE performs (UL) carrier selection. The UE measures the pathloss of downlink reference signal which preconfigured to associate with Normal Uplink (NUL) and Supplementary (SUL). The UE selects the SUL carrier for performing Random Access procedure if the RSRP of the downlink pathloss reference is less than the rsrp-ThresholdSSB-SUL; Otherwise, the UE selects normal UL carrier (NUL).

Step 103: The UE performs RA type selection. The UE selects 2-step RA if the msgA-RSRP-Threshold is configured and the RSRP of a downlink pathloss reference is above the configured msgA-RSRP-Threshold; The UE may also select 2-step RA if the BWP selected for random access procedure is only configured with 2-step random access resources. In this example, it is assumed 2-step RA type is selected by the UE. That is, the UE executes RA starts from 2-step RA.

Step S104/S121: The UE's RRC layer configures the UE's MAC layer with RA related parameters for the Random Access procedure according to the RA related configuration(s) received in Step S101.

Step S105/S122: The UE may select Random Access Resources associated with a SSB if the SSB with SS-RSRP above a rsrp-ThresholdSSB (as defined in 3GPP TS 38.331) amongst the associated SSBs is available. It is noted that the RA resource selection may include a selection among CBRA resource and CFRA resource. In this example, we assume a CBRA resource is selected by the UE. That is, the UE will perform 4-steps CBRA. In general, a UE may first determine if any CFRA resource is qualified for preamble transmission. If not, the UE may determine if any CBFA resource is qualified for preamble transmission.

Step S106: The UE selects a Random Access Preamble randomly with equal probability from the 2-step Random Access Preambles associated with the selected SSB and performs corresponding preamble transmission by using the selected PRACH occasion as a first part of MSGA transmission.

Step S107: The UE computes a MSGB-RNTI associated with the PRACH occasion in which the Random Access Preamble is transmitted. The MAC entity of the UE indicates to the Multiplexing and assembly (M&A) entity to include generate a MAC PDU which may include the MAC SDU from CCCH (CCCH SDU) in the subsequent uplink transmission if the PUSCH transmission is being made for the CCCH logical channel. Afterward, the MAC entity of the UE instructs the physical layer to transmit the PUSCH using the corresponding MSGB-RNTI as second part of the MSGA transmission (following step S106).

Step S108: Once the MSGA is transmitted, the UE starts a msgB-ResponseWindow (i.e., MSGB window). Within the MSGB window, the UE monitor PDCCH for a random access response identified by the MSGB-RNTI.

Step S109: Once a MSGB is received, the UE performs contention resolution according to one or more MAC sub-PDUs contained in the MAC PDU of the MSGB. In case of the MSGA transmission with payload on PUSCH including C-RNTI MAC CE, the MSGB may either be indicated by a downlink assignment received on the PDCCH for the MSGB-RNTI or C-RNTI. However, in case of the MSGA transmission with payload on PUSCH including MAC SDU from CCCH, the MSGB may only can be indicated by a downlink assignment received on the PDCCH identified by the MSGB-RNTI. The MAC PDU of the MSGB may but not limited to consist of several types of MAC subPDU: a MAC subPDU including backoff indicator (BI), a MAC subPDU including success RAR, a MAC subPDU including MAC SDU, a MAC subPDU including fallback RAR, a MAC subPDU including data for CCCH (data of signal radio bearer) and a subPDU including Padding (i.e., a padding subPDU). In one example, if the CCCH SDU was included in the MSGA and the UE Contention Resolution Identity in the MAC subPDU matches the CCCH SDU, the MAC entity of the UE set the C-RNTI to the value received in the success RAR, and then consider this Random Access Response reception successful and move to step S110. In another example (i.e., fallback RAR), a subPDU including fallback RAR may be identified. If the Random Access Preamble identifier in the MAC subPDU matches the transmitted preamble (step S112), the MAC entity of the UE considers this Random Access Response reception successful and moves to step S125. And then, the UE performs Msg3 transmission based on the TC-RNTI and UL grant indicated by the fallback RAR (step S125). In more examples (e.g., NO RAR is matched the transmitted MAGA or NO RAR achieve contention resolution success), if no success RAR and fallback RAR is received which match (address for) the MSGA transmission within the MSGB window (step S111), the UE may perform random backoff according to the BI received in the MAC subPDU carrying BI or a default BI, and then go back to step S105. In case of a msgA-TransMax is configured by the gNB, the number of preamble transmission reach to the msgA-TransMax and the UE fail in the contention resolution (in step S113), the UE goes to step S122 and perform 4-step RA. Wherein, the BI value received from MSGB may be released by the UE while fallback from step S109 to step S122. In another example, the UE may set the backoff window size to zero while fallback from step S109 to step S122.

Step S110: The MAC entity of the UE considers this Random Access procedure successfully completed.

Step S123: The RA preamble transmission is known as Msg1.

Step S124: The random-access response (RAR) is known as Msg2. In one example, if no RAR is received (step S129), the MAC entity of the UE considers this Random Access Response reception fails and moves to step S122.

Step S125: The PUSCH carrying uplink data using the UL Grant received in Msg2 is known as Msg3.

Step S126: The contention resolution is known as Msg4. In one example, if contention resolution fails and a fallback RAR is received (step S127), the MAC entity of the UE considers moving to step S105. In another example, if contention resolution fails without a fallback RAR, the MAC entity of the UE considers moving to step S122.

As mentioned before, due to the performance limitation of equipped low-end hardware (e.g., a smaller number of antenna), the capability of RedCap UE may be restricted. Hence, the RedCap UE may need to be served by gNB in a different way as comparing with the legacy UE, for example, gNB may allocate smaller bandwidth to the RedCap UE than legacy UE. On a purpose of maximizing the radio resource utilization, the gNB may serve both RedCap UE and legacy UE in the same cell, however, before making different treatments among the RedCap UE and legacy UE, the gNB should somehow identify the RedCap UE among all UEs. In general, the identification may be achieved by UE performing capability reporting after having RRC connection (i.e., in RRC_CONNECTED state). However, signaling transmitted and received during and before establishing RRC connection (i.e., Random Access (RA) procedure) may also be worth to be having different treatments especially for the RedCap UE. But during the random access for initial access (i.e., before the UE capabilities are known), it is challenge for gNB to perform the corresponding RedCap UE identification. In this disclosure, we introduce a serial of newly designed mechanisms regarding on how the gNB performs the RedCap UE identification during the RA procedure as well as what corresponding UE behavior needs to be performed and clarified. And it is noted that, all those mechanisms may logically be extended to some other type of services. That is, besides the RedCap UE, a serving cell may provide a plurality type of services (e.g., the service may be Small Data Transmission (SDT), Coverage Enhancement (CovE) and/or network slicing), and it is possible that the more than one of these types of services are adopted/enabled by the UE simultaneously. For example, a UE may apply the technology of CovE and RedCap at the same time during the RA, and it is beneficial for gNB to accomplish corresponding identification before the RA procedure is complete. The introduced mechanisms will consider the combination of these type of services.

As briefly mentioned before, some mechanisms for gNB to identify particular type of UE on above random access (RA) procedure is introduced. Before getting into the details of the mechanism, some clarification on the term is addressed. It is noted that, in present disclosure, the term "particular type of UE" means UE which applied particular type of service (e.g., the service may be Small Data Transmission (SDT), Coverage Enhancement (CovE) and/or network slicing). And, it is also noted that a type of service which applied by a UE may be interpreted as a feature which applied by the UE. Hence, the term of "particular type of UE" may also be interchangeable with "particular feature of UE" or "a feature applied by the UE".

Association Between RACH Resource and Type of Service

In earlier releases (e.g., 15 and 16) of NR, the radio resource utilized by a UE to perform RA procedure was reserved and pre-configured by a gNB. The radio resource here means the (physical) random access channel ((P)RACH) configuration. It is noted that the RACH configuration applied by a UE may be either configured by gNB through a downlink (DL) RRC configuration carried by a dedicated downlink RRC message and/o be configured by gNB through a RRC configuration carried by a broadcast system information. An early indication contained in Msg1 and/or Msg3, and MsgA if supported, may be applied by a particular type of UEs to be explicitly identifiable to networks (i.e., gNB). The Msg1 may refer to the uplink signaling transmitted, by the UE, in step S123 of FIG. 1. And, the MsgA may refer to the uplink signaling transmitted, by the UE, in steps S106 and S107 of FIG. 1. And, the Msg3 may refer to the uplink signaling transmitted, by the UE, in step S125 of FIG. 1. Before providing the RACH related configuration to the UE, the gNB may divide (partition) RACH resource into at least two parts (i.e., a subset of resources), each part associates with at least a particular type of service(s). Afterward, the gNB may provide UE the RACH configuration and the said association configuration. Besides the RACH resource configured for particular type of service, there may be at least one part be reserved by the gNB for legacy RA. Once a UE initiates a RA procedure, according to the pre-configured association configuration, the UE performs the RA procedure by applying particular part of RACH resource and then the UE implicitly indicate gNB the UE was applying a particular type of service associated with the particular part of RACH resource. In other words, through the RACH resource the UE applied for corresponding RA procedure, the gNB may identify which type of service the UE is preferred/applied. In this disclosure, the behavior regarding on the identification performed by the gNB may be called an "early identification". And, the indication (either implicitly or explicitly) performed by the UE during the Msg1, Msg3 and MsgA transmission may be called an "early indicator".

It is noted that the RACH resource mentioned above may be interpreted as one or more implementations as below:

The RACH resource may be interpreted as a radio resource defined in physical layer for preamble transmission. In some cases, we said RACH resource as RACH occasion (RO) or preamble group.

In one implementation, a subset of resource may be associated with a combination of different services (e.g., the service may be Small Data Transmission (SDT), Coverage Enhancement (CovE) and/or network slicing and/or some other services). And, the association between subset of resource and the combination of services may be pre-defined or pre-configured by the gNB. The association information/configuration may be broadcast by the gNB via system information block, via dedicated signaling (e.g., RRC release message) or via NAS message. That is, once a UE apply more than one service at a time (e.g., CovE and RedCap), the UE may apply the subset of resource which associated with the services it applies for RA procedure.

The definition of SDT may be: UEs with infrequent (periodic and/or non-periodic) data transmission are generally maintained by the network in the RRC_INACTIVE state. Until Rel-16, the RRC_INACTIVE state doesn't support data transmission. Hence, the UE has to resume the connection (i.e., move to RRC_CONNECTED state) for any DL (MT) and UL (MO) data. Connection setup and subsequently release to INACTIVE state happens for each data transmission however small and infrequent the data packets are. This results in unnecessary power consumption and signalling overhead. For the RRC_INACTIVE state, UL small data transmissions for RACH-based schemes (i.e. 2-step and 4-step RACH).

The definition of RedCap may be: RedCap UE type including capabilities for RedCap UE identification and for constraining the use of those RedCap capabilities only for RedCap UEs, and preventing RedCap UEs from using capabilities not intended for RedCap UEs including at least carrier aggregation, dual connectivity and wider bandwidths. The RedCap UE support for the following UE complexity reduction features:

Reduced maximum UE bandwidth;
Reduced minimum number of Rx branches;
Maximum number of DL MIMO layers;
Relaxed maximum modulation order;
Duplex operation.

The definition of CovE may be: UE having enhancements for PUSCH, PUCCH and Msg3 PUSCH for both FR1 and FR2 as well as TDD and FDD. That may includes:

Specification of PUSCH enhancements;
Increasing the maximum number of repetitions up to a number to be determined during the course of the work;
The number of repetitions counted on the basis of available UL slots;
TBS determined based on multiple slots and transmitted over multiple slots;

Mechanism(s) to enable joint channel estimation over multiple PUSCH transmissions, based on the conditions to keep power consistency and phase continuity to be investigated;
Inter-slot frequency hopping with inter-slot bundling to enable joint channel estimation;
Specification of PUCCH enhancements;
Specify mechanism(s) to support Type A PUSCH repetitions for Msg3.

The definition of Slice may be: network slice always consists of a RAN part and a CN part. The support of network slicing relies on the principle that traffic for different slices is handled by different PDU sessions. Network can realize the different network slices by scheduling and also by providing different L1/L2 configurations.

Each network slice is uniquely identified by a S-NSSAI, as defined in TS 23.501. NSSAI (Network Slice Selection Assistance Information) includes one or a list of S-NSSAIs (Single NSSAI) where a S-NSSAI is a combination of:

mandatory SST (Slice/Service Type) field, which identifies the slice type and consists of 8 bits (with range is 0-255);
optional SD (Slice Differentiator) field, which differentiates among Slices with same SST field and consist of 24 bits.

Figure 2:
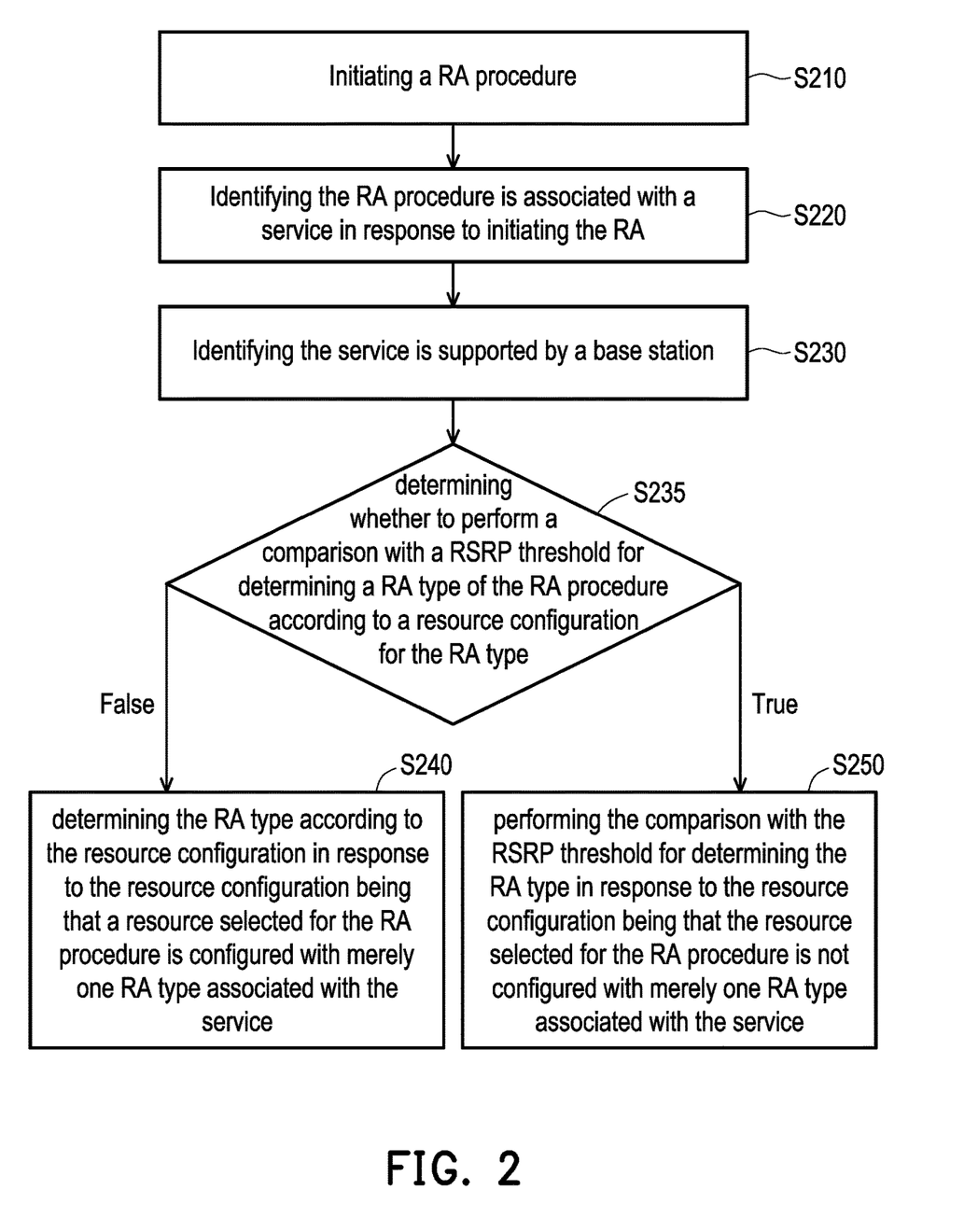
FIG. 2 is a flow chart of a method related to RA according to an example implementation of the present disclosure.

FIG. 2 is a flow chart of a method related to RA according to an example implementation of the present disclosure. Referring to FIG. 2, note that the order of the steps in this Figure may be changed according to the actual requirements.

Step S210: A UE initiates a RA procedure.

Step S220: The UE identifies the RA procedure is associated with a service in response to initiating the RA procedure.

In one embodiment, the service could be Small Data Transmission (SDT), Coverage Enhancement (CovE) and/or network slicing.

Step S230: The UE identifies the service is supported by a base station (BS) (e.g., eNB or gNB).

Step S235: The UE determines whether to perform a comparison with a reference signal received power (RSRP) threshold for determining a RA type of the RA procedure according to a resource configuration for the RA type in response to the service being supported by the BS. The RA type comprises 2-step RA and 4-step RA as introduced in FIG. 1.

Step S240: The UE determines the RA type according to the resource configuration in response to the resource configuration being that a resource selected for the RA procedure is configured with merely one RA type associated with the service.

Step S250: The UE performs the comparison with the RSRP threshold for determining the RA type in response to the resource configuration being that the resource selected for the RA procedure is not configured with merely one RA type associated with the service.

Figure 3:
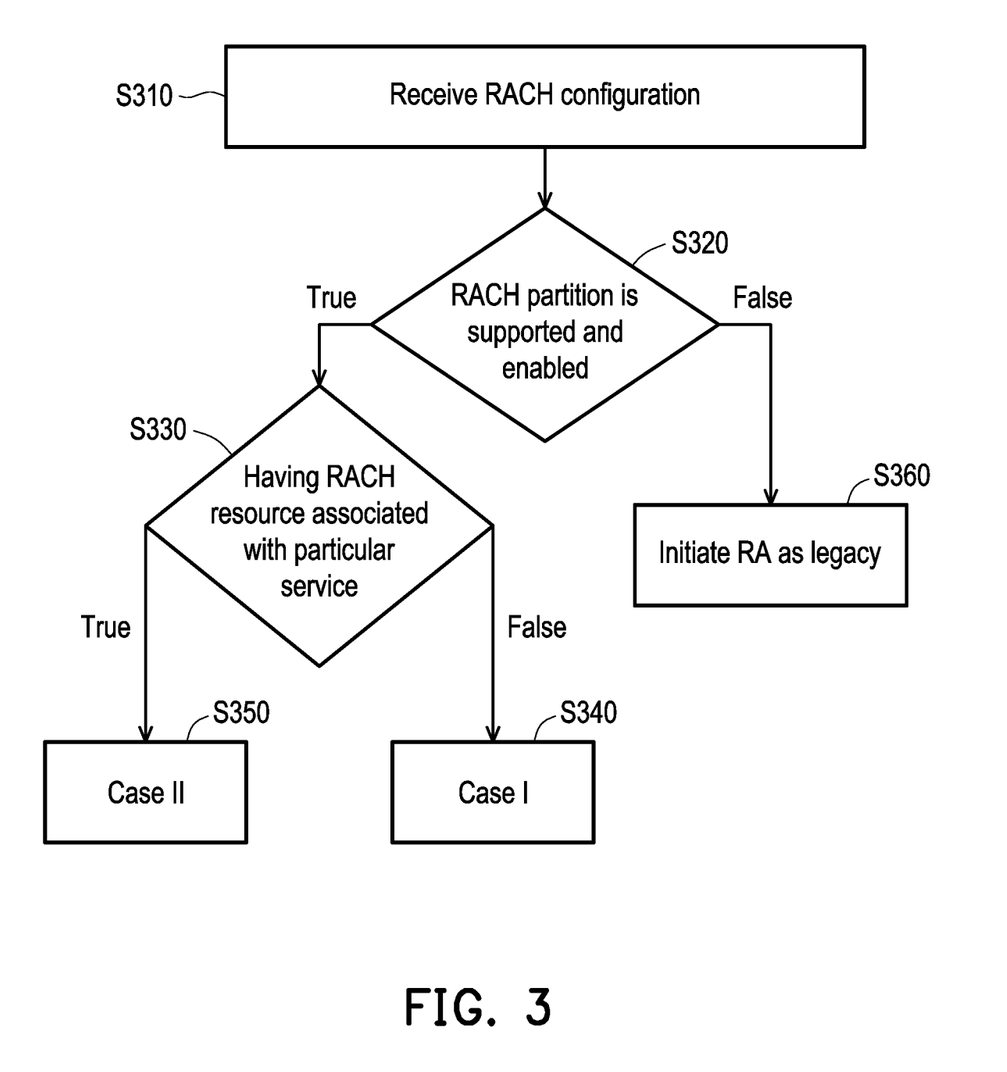
FIG. 3 is a flow chart of an overall procedure of early indication according to an example implementation of the present disclosure.

FIG. 3 is a flow chart of an overall procedure of early indication according to an example implementation of the present disclosure. Referring to FIG. 3, a general procedure for a UE to perform the early indication during a RA procedure is illustrated. In general, before a UE, which applied at least one particular of service(s), initiate a RA (for access a cell), the UE may receive a RACH configuration (i.e., the resource configuration) from a gNB via system information (e.g., system information block 1 (SIB 1)) (Step S310). Since the RACH partition function may optionally be supported by the gNB, the UE may need to perform corresponding determination based on the received RACH configuration (Step S320). That is, the UE determines whether the RACH partition is supported by the gNB or not. In one implementation, the determination includes determine whether the RACH partition is supported and enabled. The determination may be but not limited to be the UE perform the determination based on the RACH configuration received from the gNB or based on some other indicator contained in the MIB and/or SIB1 and/or the RACH configuration. For example, the gNB may provide an association configuration to UE either through the MIB and/or SIB1 and/or the RACH configuration, and then, based on the association configuration, the UE determines whether the RACH partition is supported and enabled. Once the RACH partition is either not supported or not enabled by the gNB, the UE performs RA procedure as legacy (Step S360). The UE performs RA procedure as legacy means the UE performs RA procedure by applying the RACH configuration configured for general initial access. Alternatively, the UE may bar the cell and perform cell (re) selection again to seek for a suitable cell to perform the target service type.

In some implementations, whether to perform a legacy RA procedure on the current cell or perform cell (re) selection to seek for a suitable cell may depend on the target service type.

In another implementation of step S360, the UE may perform RA procedure by applying a specific RACH resource. The specific RACH resource is reserved and configured by the gNB for general initial access. That is, during the RACH resource partition, the gNB reserves one subset of the RACH resource for any type of service (i.e., general initial access).

In case of the RACH partition is supported and enabled, the UE needs to further determine whether there is at least one subset of RACH resource is configured by the gNB for the at least one particular of service(s) (Step S330). That is, the UE checks whether the received RACH configuration having a subset of RACH resource is configured for the particular service(s). If not (Step S340), UE performs Case I which would be introduced later. In opposite, if yes (Step S350), UE performs Case II which would be introduced later. In one implementation, the Case I includes that the UE determines the RA procedure is not allowed for early identification the particular type of service(s). In another implementation, the Case I includes that the UE performs the RA procedure by applying the RACH configuration configured for general initial access as introduced for Step S360. In one implementation, the Case II includes that the UE determines the RA procedure is allowed to be initiated and the RA procedure is performed by applying the RACH configuration associated with the particular type of service(s) which is indicated by either the RACH configuration or the association configuration.

In one implementation, once the maximum number of preamble transmission has reached to a threshold, the UE may stop applying the service-specific RACH resource. In one implementation, once the maximum number of preamble transmission has reached to a threshold, the UE may bar the cell and/or perform cell (re) selection. In one implementation, once the maximum number of preamble transmission has reached to a threshold, the UE may fallback to use generic RACH resource (e.g., to perform a legacy RA procedure). In one implementation, once the maximum number of preamble transmission has reached to a threshold, the UE may record the failure information associated with the service-specific RACH resource and/or the specific service. The UE may report the failure information to the NW when connecting to the NW. In one implementation, the threshold associated with the maximum number of preamble transmission for using service-specific RACH resource may be configurable or pre-defined. In one implementation, the threshold associated with the maximum number of preamble transmission for using service-specific RACH resource may be configurable or pre-defined. In one implementation, the threshold associated with the maximum number of preamble transmission for using service-specific RACH resource may be common for all supported/enabled services. In one implementation, the threshold associated with the maximum number of preamble transmission for using service-specific RACH resource may be different for each supported/enabled service.

From UE point of view, legacy UE does not need to determine whether the RACH partition is supported and enabled. In some implementations, only advanced UE (e.g., a UE supporting SDT, slicing-based cell selection, coverage enhancement, or reduced complexity) may need to determine whether the RACH partition is supported and enabled. In some implementations, only UE (with specific services indicated by gNB in system information) needs to determine whether the RACH partition is supported and enabled.

Association Configuration

Regarding on the association configuration mentioned in the previous section, there may be multiple of alternatives designs. In general, before a UE initiates a random access procedure, the UE may receive a RACH configuration from the gNB either through system information block (e.g., SIB1) or dedicated DL RRC signaling. Besides the received RACH configuration, the UE may additionally receive an association configuration from the gNB. The association configuration indicates UE at least the association between a particular (combination) type of service the gNB supported and corresponding RACH resource.

In one implementation, the UE may receive a first indicator indicating the supported type of service for a BS (e.g., gNB or called serving cell), wherein the first indicator may be but not limited to be contained in the MIB or SIB1 or dedicated DL RRC message. The service supported by the BS is identified according to the first indicator. Once the UE determines, through the first indicator, a type of service which the UE preferred is supported by the gNB, in one implementation, the UE further receives a RACH configuration (i.e., the resource configuration) which carried at least a RACH resource associated with the type of service indicating by a second indicator. The second indicator may be but not limited to be received from the gNB through the MIB or SIB1 or dedicated DL RRC message.

For example, the first indicator may be implemented as a list of information elements as shown in the following alternatives.

Alternative A

In the alternative A, the gNB indicates UE, through the first indicator, the gNB partition RACH resource for three types of services: RedCap, CovE and Slice. By carrying the first indicator, the gNB explicitly indicates UE which type of service is supported by the gNB and/or has associated RACH resource associated with the type of service.

Supported type of service: [RedCap, CovE, Slice];

After the UE is indicated, by the first indicator, a particular type of service is supported by the gNB, the UE further receives a particular RACH resource associated with the particular type of service as shown in the one or multiple alternative implementations in the following alternatives.

Alternative a

A RACH configuration received from the gNB, there is a second indicator (i.e., Association indicator) indicating an association between a RACH resource (configured by the RACH configuration) and a particular type of service. For example, in the alternative a, the association indicator may be implemented as a bitmap (e.g., $x_1x_2x_3$). And, in one implementation, the bitmap having a bit length equal to the number of service type is indicated in the first indicator. In another implementation, the bitmap having a bit length which longer than the number of service types is indicated in the first indicator. In this case, each bit from Most Significant Bit (MSB) or Least Significant Bit (LSB) is one on one associated with each service type indicated by the first indicator. That is, the position of each bit of the bitmap is associated the service type indicating by the first indicator. For example, the first bit (from MSB or LSB) of the bitmap is associated with the first type of service indicated by the first indicator, and the second bit (from MSB or LSB) of the bitmap is associated with the second type of service indicated by the first indicator, and so on. Each bit of the bitmap set to a particular value (e.g., set to 1) means the RACH resource configured by a RACH configuration carrying the second indicator is reserved for the type of service indicated by the corresponding bit. For example, the first indicator indicating [RedCap, CovE, Slice], and a RACH configuration indicating a RACH resource to be applied for particular type of service by the second indicator which indicated [100], it implies the RACH resource is reserved by the gNB for the RedCap. In opposite, each bit of the bitmap set to a particular value (e.g., set to 0) means the RACH resource configured by the RACH configuration carrying the second indicator is not reserved for the type of service indicated by the corresponding bit.

RACH resource config: {
Configuration which configuring a subset of RACH resource;
Association indicator: [$x_1$, $x_2$, $x_3$]
}

Alternative b

In another implementation, the gNB may reserve a (subset of) RACH resource for a combination of at least two types of service. For example, the gNB may reserve the subset of RACH resource for UE which applied RedCap and CovE simultaneously. In this case, the bits corresponding to the RedCap and CovE may be set to a particular value (e.g., set to 1) at the same time while keeping the bit corresponding to the Slice as 0. That is, the first indicator indicating [RedCap, CovE, Slice] and a RACH configuration indicating a RACH resource as well as carrying the second indicator indicating [110], it implies the (subset of) RACH resource is reserved by the gNB for a combined service type, RedCap and CovE, for early indication.

Alternative c

In some other implementations, a (subset of) RACH resource may be configured by the gNB and shared among at least two types of services. Similar as the previous implementation, in a case, the first indicator indicating [RedCap, CovE, Slice] and the bits of the bitmap carried by second indicator corresponding to the RedCap and CovE be set to a particular value (e.g., set to 1) at the same time while keeping a bit corresponding to the Slice as 0 (i.e., 110), it implies the (subset of) resource is reserved by the gNB for a both service types: RedCap and CovE. That is, either RedCap or CovE UE may be able to apply the (subset of) RACH resource for early indication.

It is noted that, RACH configuration mentioned in the present disclosure may be a RRC configuration as defined in 3GPP NR. For example: RACH-ConfigCommon, RACH-ConfigCommonTwoStepRA, RACH-ConfigDedicated, RACH-ConfigGeneric and/or RACH-ConfigGenericTwoStepRA.

RA Type Selection

The random access procedure modeled for NR (illustrated in FIG. 1), a few steps may be affected once the mechanism of RACH resource partition for early identification mechanism mentioned earlier is introduced. For example, in current NR, after UE selects a proper carrier (NUL or SUL) for RA (step S103 of FIG. 1) the UE may perform RA type selection afterward. However, since the RA resource for 2-step RA and 4-step RA may be independently configured by the gNB, and if gNB only configures RA resource for particular type of service for one of RA type (i.e., 2-step RA and 4-step), the performance of early identification may also be affected.

In general, if a UL BWP (i.e., the resource selected for the RA procedure) is configured with either service type specific 4-step or 2-step RA resource, the UE may select corresponding type which is configured with the type of specific RACH resource. Or, if a UL BWP is configured with both service type specific 4-step or 2-step RA resource, the UE may select RA type according to the service type specific RSRP threshold.

In the following, a serial of designs is introduced on how UE behaves in each case as below:

Case A: UE is configured with service type specific RA resource for either 2-step RA or 4-step RA. That is, the resource configuration is that a resource selected for the RA procedure is configured with merely one RA type associated with the service.

Case B: UE is configured with service type specific RA resource for both 2-step RA either 4-step RA to UE. That is, the resource configuration is that a resource selected for the RA procedure is not configured with merely one RA type associated with the service but is configured with both two RA types.

Case C: UE is neither configured with service type specific RA resource for 2-step RA nor 4-step RA. That is, the resource configuration is that a resource selected for the RA procedure is not configured with merely one RA type associated with the service and is configured with none of the RA types.

In Case A, in one implementation, the UE may determine the RA type as a first type in response to the first type from the 2-step RA and the 4-step RA being configured with the resource selected for the RA procedure associated with the service. During the RA type selection procedure (i.e., step S103 of FIG. 1), the UE may determine to select 2-step RA or 4-step RA according to whether a service type specific RA resource has been configured by the gNB, wherein the service type is UE prefer for early identification. For example, a UE applied RedCap service, the UE may determine to select 2-step RA or 4-step RA according to whether gNB had configured RA resource for RedCap service for 2-step RA or 4-step RA. In one implementation, a RA resource for RedCap service is configured by the gNB only for 2-step RA but not for 4-step RA, in the RA type selection procedure, the UE selects 2-step RA for the purpose of early identification. In another implementation, a RA resource for RedCap service is configured by the gNB only for 2-step RA but not for 4-step RA, in the RA type selection procedure, the UE selects 2-step RA for the purpose of early identification if UE is configured with either a msgA-RSRP-Threshold (as introduced in step S101 of FIG. 1) or the service type specific RSRP threshold (i.e., Service RSRP-Threshold), and a RSRP of a downlink pathloss reference is above the configured msgA-RSRP-Threshold or the Service RSRP-Threshold. In more implementations, a RA resource for RedCap service is configured by the gNB only for 4-step RA but not for 2-step RA, in the RA type selection procedure, the UE selects 4-step RA for the purpose of early identification. In more implementations, if a type of service can be indicated in MSG3 or MSGA, UE may determine not to indicate the type of service via PRACH transmission. UE may select the RA type based on a combination types of services not including the type of services that can be indicated in MSG3 or MSGA. For example, when UE applies [RedCap, CovE, Slice] types of services, if RedCap service can be indicated via MSGA, e.g., by using a LCID specifically for RedCap, UE may select a 2-step RA resource associated with [CovE, Slice] when the 2-step RA resource associated with [RedCap, CovE, Slice] is not configured and when the 2-step RA resource associated with [CovE, Slice] is configured.

Figure 4:
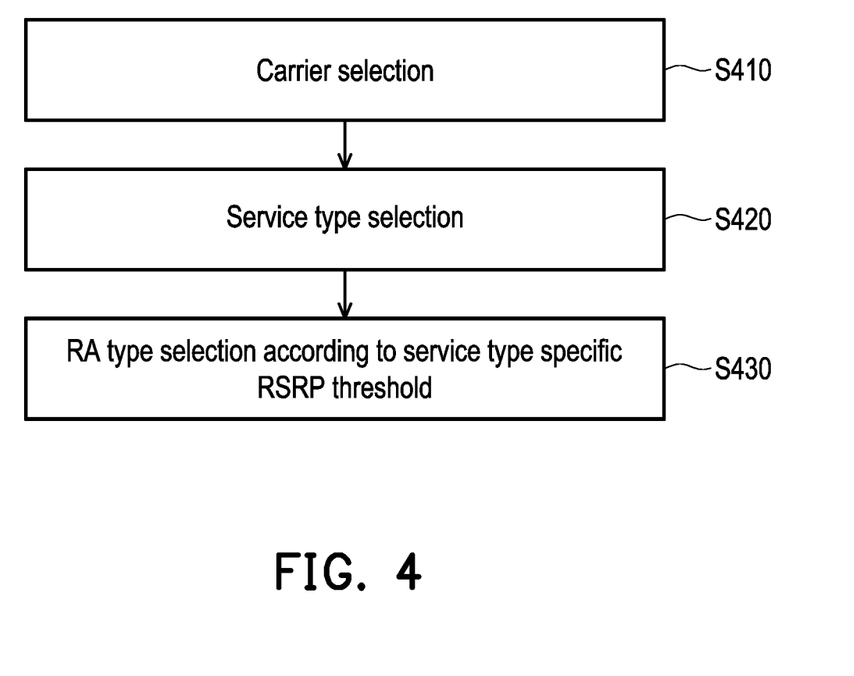
FIG. 4 is a flow chart of a RA type selection according to an example implementation of the present disclosure.

In Case B, in one implementation, the UE may determine the RA type according to the comparison with the RSRP threshold in response to both the 2-step RA and the 4-step RA being configured with the resource selected for the RA procedure associated with the service. FIG. 4 is a flow chart of a RA type selection according to an example implementation of the present disclosure. Referring to FIG. 4, a proposed RA type selection mechanism is illustrated. That is, after UE finished the carrier selection (step S410), the UE determines which type of service it is applying (for early indication) (step S420). Then, UE performs RA type selection (i.e., 2-step RA or 4-step RA) according to a service type specific RSRP threshold (step S430). That is, the UE may perform a DL reference signal (RS) measurement and compare a reference signal received power (RSRP) of the measured DL RS with a pre-configured threshold specific for the service type. In one implementation, once the RSRP is equal or above the threshold, the UE applies 2-step RA by applying the RACH resource reserve for the type of service. That is, the UE determines the RA type as the 2-step RA in response to a measured RSRP being not less the RSRP threshold. And, once the RSRP is below to the threshold, the UE applies 4-step RA by applying the RACH resource reserve for the type of service. That is, the UE determines the RA type as the 4-step RA in response to a measured RSRP being less than the RSRP threshold.

Regarding on how the gNB provide service type specific RSRP threshold as mentioned earlier, there may be multiple of alternatives designs. In one implementation, the UE may receive a third indicator indicating the RSRP threshold for a (specific) type of the service via SIB 1, MIB, or RRC message. In general, before a UE selects RA type, the UE may receive a RACH configuration from the gNB either through system information block (e.g., SIB1) or dedicated DL RRC signaling. Besides, in the received RACH configuration, the UE may additionally receive at least one of RSRP threshold for particular type of service. In another implementation, the UE may receive, from the gNB, multiple of RSRP thresholds and each of it is associated with a particular of type of service. The association may be but not limited to be configured by the gNB through an association configuration. The association configuration indicates UE at least the association between a particular (combination) type of service the gNB supported and corresponding RSRP threshold.

In one implementation, the UE may receive a first indicator indicating the supported type of service for a gNB (serving cell), wherein the first indicator may be but not limited to be contained in the MIB or SIB1 or dedicated DL RRC message. That is, whether a particular type of service is provided/supported by a gNB may be indicated by the first indicator. Once the UE determines, through the first indicator, a type of service which the UE preferred is supported by the gNB, the UE further receives a RACH configuration which carried at least a RACH resource associated with the type of service indicated by a second indicator. And, the UE further receives a third indicator which indicates a RSRP threshold for the type of service. In another implementation, the third indicator indicates an association between a RSRP threshold and a type of service. The third indicator may be but not limited to be received from the gNB through the MIB or SIB1 or dedicated DL RRC message.

For example, the third indicator may be implemented as a list of information elements as shown in the following alternatives.

Alternative a1

In the alternative a1, the UE is configured with a RSRP threshold, and the third indicator explicitly indicating the RSRP threshold is for the UE to be applied for which type of service. In one implementation, the third indicator may be a bitmap (i.e., $x_1x_2x_3$). And, in one implementation, the bitmap having a bit length equal to the number of service types is indicated in the first indicator. The position of each bit of the bitmap is associated the service type indicated by the first indicator. That is, the first bit of the bitmap is associated with the first type of service indicated by the first indicator, and the second bit of the bitmap is associated with the second type of service indicated by the first indicator, and so on. Each bit of the bitmap set to a particular value (e.g., set to 1) means the RSRP threshold is configured for the type of service corresponding to the bit. For example, the first indicator indicating [RedCap, CovE, Slice] and a third indicator indicating [100], it implies the RSRP threshold is configured by the gNB for the RedCap.

Alternative b1

In another implementation, the gNB may supports at least two types of service, for example, RedCap and CovE. In this case, the bits corresponding to the RedCap and CovE be set to a particular value (e.g., set to 1) at the same time while keeping the bit corresponding to the Slice as 0. That is, the first indicator indicating [RedCap, CovE, Slice] and a third indicator indicating [110], it implies the RSRP threshold is reserved by the gNB for a combined service type, RedCap and CovE, for RA type selection.

Alternative c1

In some other implementations, a RSRP threshold may be configured by the gNB and shared among at least two types of services. Similar as the previous implementation, in a case, the first indicator indicating [RedCap, CovE, Slice]

and the bits of the bitmap carried by a third indicator corresponding to the RedCap and CovE be set to a particular value (e.g., set to 1) at the same time while keeping a bit corresponding to the Slice as 0 (i.e., 110), it implies the RSRP threshold is reserved by the gNB for both service types: RedCap and CovE. That is, either RedCap or CovE UE may be able to apply the RSRP threshold for RA type selection.

Alternative d1

The gNB configures multiple of RSRP thresholds to the UE through a fourth indicator. The fourth indicator may be but not limited to be received from the gNB through the MIB or SIB1 or dedicated DL RRC message. The fourth indicator indicating an association between each (combination) type of service and one of the configured multiple RSRP thresholds.
MSGA-RSRP-Threshold I value a;
MSGA-RSRP-Threshold II value b;
MSGA-RSRP-Threshold III value c;
RACH resource config: {
Service type combination[110]; RedCap+CovE
MSGA-RSRP-Threshold [I, II or III]; //
RO config}.

In Case C, since there is no any RACH resource configured to be reserved for a service type, which applied by the UE, for early identification, the UE performs the RA type selection as legacy.

In some other cases, a UE which applied a combination of at least two types of services (e.g., RedCap and CovE), and gNB configures only a subset of service type specific RACH resource for one of RA type (e.g., 2-step) and gNB configures another subset of service type specific RACH resource for another RA type (e.g., 4-step), the UE may perform the RA type selection according to one of the alternative implementations shown as below:

In one implementation, the UE may select one of the RA types according to an DL RS measurement result (i.e., RSRP) as legacy.

In one implementation, the UE may perform the RA type selection according to a pre-configuration made by the gNB. That is, the pre-configuration configures UE that one of the service types is a default/high-priority service, the UE should prioritize the selection of particular type of RA if a RACH resource for the service type is configured by the gNB.

Random Access Fallback

In one implementation, the UE may receive a fourth indicator indicating a fallback from a first type of the service of 2-step RA to a second type of the service of 4-step RA. As shown in the step S109 of FIG. 1, the UE may need to perform a fallback from 2-step RA to 4-step RA once one or more specific condition is satisfied. For example, the fallback may be triggered by either a fourth indicator received from the gNB or be triggered after a maximum number of times a MSGA transmission is reached. Based on the modeling in FIG. 1, after UE finishes a MSGA transmission, the UE starts a msgB-ResponseWindow. Within the MSGB window, UE monitor possible MSGB transmission from gNB. Once a MSGB is received, the UE will perform contention resolution as the introduction made in FIG. 1. That is, if a fallback RAR is received, the UE may perform fallback from 2-step RA to 4-step RA. In another case, once there is no any RAR matched with the transmitted MSGA and contention resolution failed, the UE also needs to perform the fallback behavior.

After the mechanism regarding on the RACH resource partition (i.e., service type specific RACH resource) for early identification is introduced, the legacy fallback behavior may be affected and needs to be enhanced. For example, once the fallback condition is satisfied while the UE applied service type specific RACH resource for MSGA transmission, it is not clear which RACH resource may be applied by the UE after fallback to 4-step RA. Depending on the configuration made by the gNB, the UE behavior for the fallback may have variety of alternative of implementations. For example, the fallback may be implemented as the UE fallback from a service type specific 2-step RA to the service type specific 4-step RA, or UE fallback from a service-specific 2-step RA to legacy (not service specific) 4-step RA or UE fallback from a first combination types of services specific 2-step RA to a second combination types of services specific 4-step RA, wherein the second combination types of services is a subset of the first combination types of services. It is noted that, the term "service-specific 2-step RA" means the UE performs 2-step RA by applying RACH resource configured by the gNB for the type of service specifically. And, the term "service-specific 4-step RA" means the UE performs 4-step RA by applying RACH resource configured by the gNB for the type of service specifically. The term "legacy 4-step RA" and "legacy 2-step RA" means the UE perform 4-step RA and 2-step RA by applying RACH resource which is not configured for specific type of service (as legacy RA).

In one implementation, a fourth indicator may be carried by the fallback RAR, wherein the fourth indicator may either indicates one of the following:
Fallback to the service-specific 4-step RA;
Fallback to another set of service-specific 4-step RA;
Fallback to legacy 4-step RA;
It is noted that, once a UE selects legacy 2-step RA, the UE still may be possible to be indicated to perform fallback from legacy 2-step RA to particular type of service-specific 4-step RA if the UE is configured with the particular type of service-specific 4-step RA. In one implementation, the UE may determines to select the particular type of service-specific 4-step RA only when the UE is indicated by the gNB (via fallback RAR).

It is noted that all the designs/embodiment/implementations introduced within this disclosure are not limited to be applied for dealing with the problem mention within this disclosure. For example, them can be applied to solve any of problem existed in radio access network of cellular wireless communication system.

It is noted that all the number listed within the designs/embodiment/implementations introduced within this disclosure are just an example for illustration how the method is executed.

It is noted that the downlink RRC message mentioned in the present disclosure may be but not limited to be RRCReconfiguration, RRCResume, RRCReestablishment, RRCSetup or any other downlink unicast RRC message.

It is noted that "a specific configuration is per UE configured" or "a specific configuration is configured for a UE" mentioned in the present disclosure may represented as the specific configuration may be but not limited to be configured within a downlink RRC message.

It is noted that "a specific configuration is per cell group configured" or "a specific configuration is configured for a cell group" mentioned in the present disclosure may represented as the specific configuration may be but not limited to be configured within a CellGroupConfig or MAC-CellGroupConfig or PhysicalCellGroupConfig IE.

It is noted that "a specific configuration is per serving cell configured" or "a specific configuration is configured for a serving cell" mentioned in the present disclosure may represented as the specific configuration may be but not limited to be configured within a ServingCellConfigCommon or ServingCellConfig or PUSCH-ServingCellConfig or PDSCH-ServingCellConfig IE.

It is noted that "a specific configuration is per UL BWP or per BWP configured" or "a specific configuration is configured for a UL BWP or for a BWP" mentioned in the present disclosure may represented as the specific configuration may be but not limited to be configured within a BWP-Uplink or BWP-UplinkDedicated or BWP-UplinkCommon or PUSCH-ConfigCommon or PUSCH-Config IE.

It is noted that "a specific configuration is per DL BWP or per BWP configured" or "a specific configuration is configured for a DL BWP or for a BWP" mentioned in the present disclosure may represented as the specific configuration may be but not limited to be configured within a BWP-Downlink or BWP-DownlinkDedicated or BWP-DownlinkCommon or PDSCH-ConfigCommon or PDSCH-Config IE.

It is noted that the "beam" mentioned within this disclosure is equivalent to a spatial (domain) filtering. In one example, the spatial filtering is applied in analog domain by adjusting phase and/or amplitude of the signal before transmitted by a corresponding antenna element. In another example, the spatial filtering is applied in digital domain by Multi-input Multi-output (MIMO) technique in wireless communication system. For example, a UE made a PUSCH transmission by using a specific beam means the UE made the PUSCH transmission by using the specific spatial/digital domain filter. The "beam" may also be but not limited to be represented as an antenna, an antenna port, an antenna element, a group of antennas, a group of antenna ports, or a group of antenna elements. The beam may also be formed by a certain reference signal resource. In brief, the beam can be equivalent to a spatial domain filter which radiated the EM wave through.

It is noted that the "transmitted" within all the implementations/embodiments introduced above can be defined as corresponding MAC CE/MAC PDU/layer 1 signaling/higher layer signaling, is started to be transmitted or completely transmitted or is already delivered to corresponding HARQ process/buffer for transmission. The "transmitted" within all the implementations/embodiments introduced above can also be defined as the HARQ ACK feedback (response from gNB) of the MAC PDU carrying the MAC CE/MAC PDU/layer 1 signaling/higher layer signaling is received. The "transmitted" within all the implementations/embodiments introduced above can also be defined as corresponding MAC CE/MAC PDU is built. It is noted that the "HARQ_ACK feedback" can be implemented as a DCI format 0_0, 0_1 or some other format of DCI was received by the UE from the gNB on PDCCH. The received DCI contains a new data indicator (NDI) which is set to a specific value (e.g., set to 1) and the DCI also indicating a HARQ process ID which same as a HARQ process ID applied by/indicated to be used for the HARQ process of the MAC PDU (carrying the BFRQ MAC CE) transmission.

The PDCCH mention in the present disclosure is transmitted by the gNB to the UE. Or we can say the PDCCH is received by the UE from the gNB. The PDSCH mention in the present disclosure is transmitted by the gNB to the UE. Or we can say the PDSCH is received by the UE from the gNB. The PUSCH mention in the present disclosure is transmitted by the UE to the gNB. Or we can say the PUCCH is received by the gNB from the UE.

A PDSCH/PDSCH/PUSCH transmission may spanning multiple of symbols in time domain. A time duration of a PDSCH/PDSCH/PUSCH (transmission) implies a time interval starts from the beginning of the first symbol of the PDSCH/PDSCH/PUSCH (transmission) and end at the end of the last symbol of the PDSCH/PDSCH/PUSCH (transmission).

The term "A and/or B" within the present disclosure means "A", "B" or "A and B". The term "A and/or B and/or C" within the present disclosure means "A", "B", "C", "A and B", "A and C", "B and C" or "A and B and C".

The term "A/B" within the present disclosure means "A" or "B".

The term "interrupt" within the present disclosure may have the same meaning as "stop", "cancel" or "skip" in the present disclosure.

The term "instruct the PHY to generate acknowledgement" can have the same meaning as "instruct the PHY to perform HARQ-ACK feedback" in the present disclosure.

The term "acknowledgement" may have the same meaning as "HARQ-ACK" or "HARQ-ACK feedback" in the present disclosure.

It is noted that "the UE may not need to perform the corresponding HARQ feedback" in the present disclosure may equal to "the HARQ entity/HARQ process may not need to perform the corresponding HARQ feedback".

In the present disclosure, "by specific Physical layer signaling" may be but not limited to be:
By a specific format of DCI;
By a specific field of a DCI;
By a specific field of a DCI, and the field is set to a specific value; or
By a DCI with CRC bits scrambled with a specific RNTI.

In the present disclosure, "a MAC timer" may be but not limited to be configured by RRC which is indicated by the gNB. The UE may be configured with an initial value of the timer and the unit of the value may be but not limited to be frame/sub-frame/milli second/sub-milli second/slot/symbol. The timer may be started and/or restarted by the UE (UE's MAC entity). The timer may be started and/or restarted by the UE (UE's MAC entity) when some specific condition is satisfied.

Figure 5:
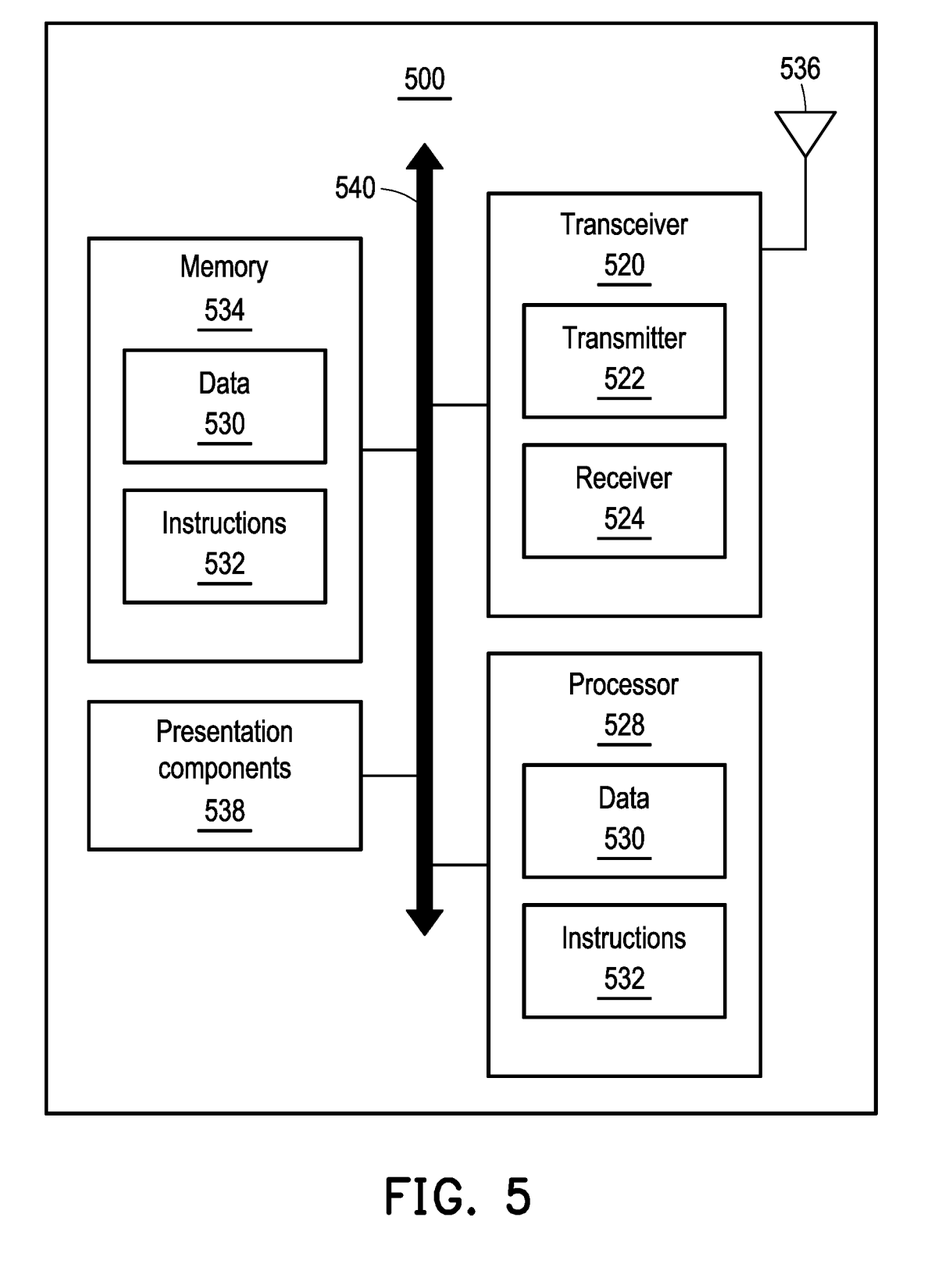
FIG. 5 is a block diagram illustrating a node for wireless communication according to an example implementation of the present disclosure.

FIG. 5 is a block diagram illustrating a node for wireless communication according to an example implementation of the present application. Referring to FIG. 5, a node 500 may include a transceiver 520, a processor 528, a memory 534, one or more presentation components 538, and at least one antenna 536. The node 500 may also include an RF spectrum band module, a base station communications module, a network communications module, and a system communications management module, Input/Output (I/O) ports, I/O components, and power supply (not explicitly shown in FIG. 5). Each of these components may be in communication with each other, directly or indirectly, over one or more buses 540. In one implementation, the node 500 may be a UE or a base station that performs various functions described herein, for example, with reference to FIGS. 1 through 4.

The transceiver 520 having a transmitter 522 (e.g., transmitting/transmission circuitry) and a receiver 524 (e.g., receiving/reception circuitry) may be configured to transmit and/or receive time and/or frequency resource partitioning information. In some implementations, the transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media can be any available media that can be accessed by the node 500 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 534 may include computer-storage media in the form of volatile and/or non-volatile memory. The memory 534 may be removable, non-removable, or a combination thereof. Exemplary memory includes solid-state memory, hard drives, optical-disc drives, and etc. As illustrated in FIG. 5, The memory 534 may store computer-readable, computer-executable instructions 532 (e.g., software codes) that are configured to, when executed, cause the processor 528 to perform various functions described herein, for example, with reference to FIGS. 1 through 5-1. Alternatively, the instructions 532 may not be directly executable by the processor 528 but be configured to cause the node 500 (e.g., when compiled and executed) to perform various functions described herein.

The processor 528 (e.g., having processing circuitry) may include an intelligent hardware device, e.g., a Central Processing Unit (CPU), a microcontroller, an ASIC, and etc. The processor 528 may include memory. The processor 528 may process the data 530 and the instructions 532 received from the memory 534, and information through the transceiver 520, the base band communications module, and/or the network communications module. The processor 528 may also process information to be sent to the transceiver 520 for transmission through the antenna 536, to the network communications module for transmission to a core network.

One or more presentation components 538 presents data indications to a person or other device. Exemplary presentation components 538 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method related to random access (RA), used for a user equipment (UE), the method comprising:
   initiating a RA procedure;
   identifying the RA procedure is associated with a service in response to initiating the RA procedure;
   identifying the service is supported by a base station (BS);
   determining whether to perform a comparison with a reference signal received power (RSRP) threshold for determining a RA type of the RA procedure according to a resource configuration for the RA type in response to the service being supported by the BS, wherein the RA type comprises 2-step RA and 4-step RA;
   determining the RA type according to the resource configuration in response to the resource configuration being that a resource selected for the RA procedure is configured with merely one RA type associated with the service; and
   performing the comparison with the RSRP threshold for determining the RA type in response to the resource configuration being that the resource selected for the RA procedure is not configured with merely one RA type associated with the service.

2. The method of claim 1, further comprising:
   determining the RA type as a first type in response to the first type from the 2-step RA and the 4-step RA being configured with the resource selected for the RA procedure associated with the service.

3. The method of claim 1, further comprising:
   determining the RA type according to the comparison with the RSRP threshold in response to both the 2-step RA and the 4-step RA being configured with the resource selected for the RA procedure associated with the service.

4. The method of claim 3, wherein determining the RA type according to the comparison with the RSRP threshold comprises:
   determining the RA type as the 2-step RA in response to a measured RSRP being not less the RSRP threshold; and
   determining the RA type as the 4-step RA in response to a measured RSRP being less than the RSRP threshold.

5. The method of claim 1, further comprising:
   receiving a first indicator indicating the service is supported by the BS via system information block (SIB) 1, master information block (MIB), or radio resource control (RRC) message, wherein the service supported by the BS is identified according to the first indicator.

6. The method of claim 5, wherein the first indicator explicitly indicates a type of the service supported by the BS.

7. The method of claim 1, further comprising:
   receiving a second indicator indicating the resource configuration associated with a type of the service via SIB 1, MIB, or RRC message.

8. The method of claim 7, wherein the second indicator is a bitmap in which each bit corresponds to the service supported by the BS.

9. The method of claim 1, further comprising:
receiving a third indicator indicating the RSRP threshold for a type of the service via SIB 1, MIB, or RRC message.

10. The method of claim 1, further comprising:
receiving a fourth indicator indicating a fallback from a first type of the service of 2-step RA to a second type of the service of 4-step RA.

11. A user equipment (UE), comprising:
a memory, comprising computer-executable instructions embodied thereon; and
a processor, coupled to the memory, and configured to execute the computer-executable instructions to:
initiate a random access (RA) procedure;
identify the RA procedure is associated with a service in response to initiating the RA procedure;
identify the service is supported by a base station (BS);
determine whether to perform a comparison with a reference signal received power (RSRP) threshold for determining a RA type of the RA procedure according to a resource configuration for the RA type in response to the service being supported by the BS, wherein the RA type comprises 2-step RA and 4-step RA;
determining the RA type according to the resource configuration in response to the resource configuration being that a resource selected for the RA procedure is configured with merely one RA type associated with the service; and
perform the comparison with the RSRP threshold for determining the RA type in response to the resource configuration being that the resource selected for the RA procedure is not configured with merely one RA type associated with the service.

12. The UE of claim 11, wherein the processor is further configured to:
determine the RA type as a first type in response to the first type from the 2-step RA and the 4-step RA being configured with the resource selected for the RA procedure associated with the service.

13. The UE of claim 11, wherein the processor is further configured to:
determine the RA type according to the comparison with the RSRP threshold in response to both the 2-step RA and the 4-step RA being configured with the resource selected for the RA procedure associated with the service.

14. The UE of claim 13, wherein the processor is further configured to:
determine the RA type as the 2-step RA in response to a measured RSRP being not less the RSRP threshold; and
determine the RA type as the 4-step RA in response to a measured RSRP being less than the RSRP threshold.

15. The UE of claim 11, further comprising:
a transceiver, coupled to the processor, and the processor is further configured to:
receive, through the transceiver, a first indicator indicating the service is supported by the BS via system information block (SIB) 1, master information block (MIB), or radio resource control (RRC) message, wherein the service supported by the BS is identified according to the first indicator.

16. The UE of claim 15, wherein the first indicator explicitly indicates a type of the service supported by the BS.

17. The UE of claim 11, further comprising:
a transceiver, coupled to the processor, and the processor is further configured to:
receive, through the transceiver, a second indicator indicating the resource configuration associated with a type of the service via SIB 1, MIB, or RRC message.

18. The UE of claim 17, wherein the second indicator is a bitmap in which each bit corresponds to the service supported by the BS.

19. The UE of claim 11, further comprising:
a transceiver, coupled to the processor, and the processor is further configured to:
receive, through the transceiver, a third indicator indicating the RSRP threshold for a type of the service via SIB 1, MIB, or RRC message.

20. The UE of claim 11, further comprising:
a transceiver, coupled to the processor, and the processor is further configured to:
receive, through the transceiver, a fourth indicator indicating a fallback from a first type of the service of 2-step RA to a second type of the service of 4-step RA.

* * * * *